UNITED STATES PATENT OFFICE.

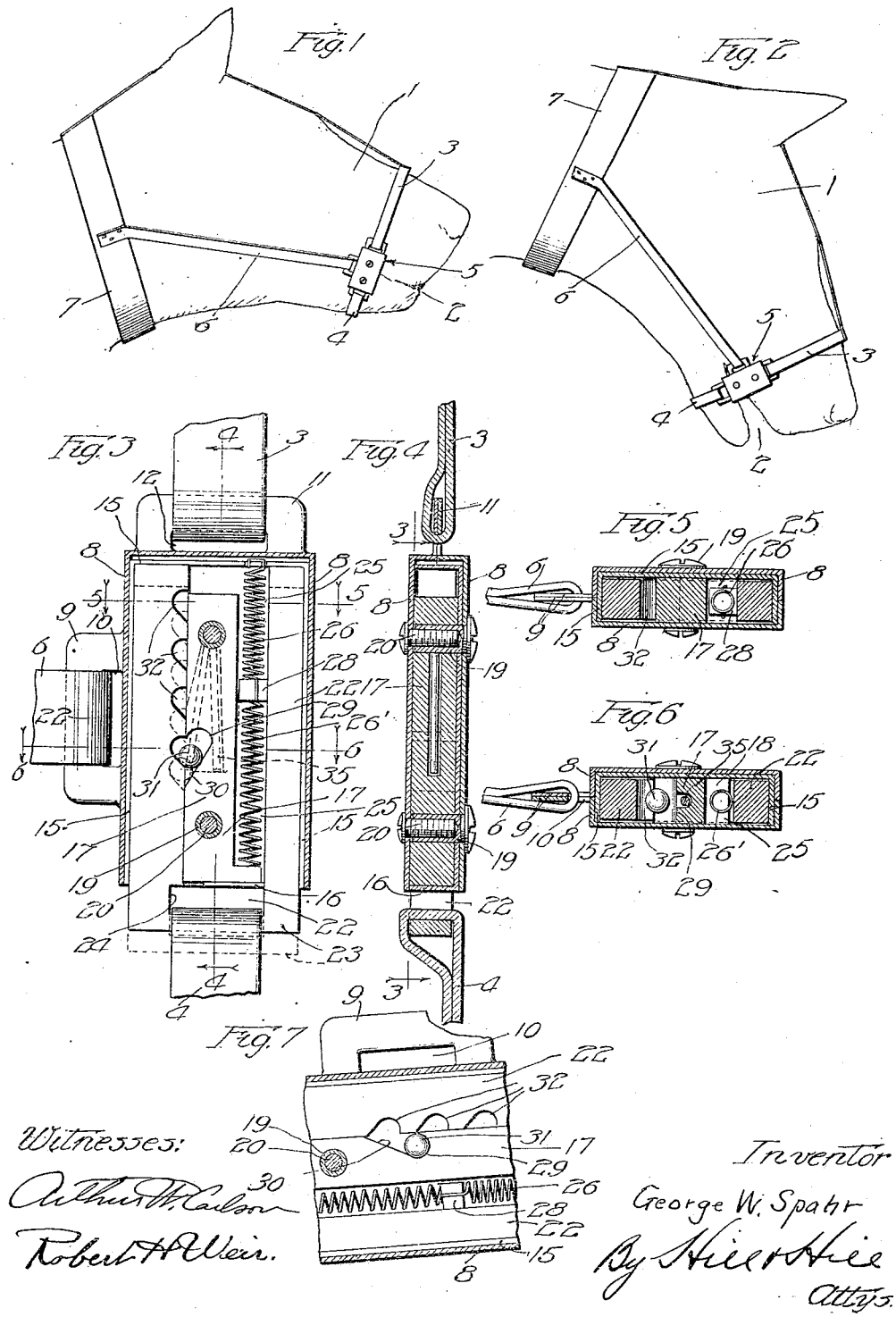

GEORGE W. SPAHR, OF CHICAGO, ILLINOIS.

MUZZLE.

1,297,301.  Specification of Letters Patent.  Patented Mar. 11, 1919.

Application filed April 3, 1918. Serial No. 226,359.

*To all whom it may concern:*

Be it known that I, GEORGE W. SPAHR, a citizen of the United States, residing at Chicago, in the county of Cook and State of Illinois, have invented certain new and useful Improvements in Muzzles, of which the following is a description.

My invention belongs to that general class of devices known as muzzles or animal securing devices for preventing the animal from opening its mouth at such times as may be desired. More particularly it relates to a muzzle whereby at certain times or under certain conditions, as for example when feeding or drinking, the animal may open its mouth in the ordinary or usual manner, but at such times as the head is raised or the muzzle or snout of the animal is elevated, the mouth will be locked shut automatically. The invention has among its objects the production of a device of the kind described that is simple, convenient, comfortable, durable, efficient, satisfactory and automatic in operation for use wherever found applicable. It has particularly as an object the production of a device that will permit the animal feeding when its head is inclined toward the ground. The same is adapted to be used on dogs, cattle and calves, horses, sheep, hogs and various other animals. Many other objects, advantages and uses of the device herein described will be obvious to those skilled in the art from the disclosures herein given.

To this end, my invention consists in the novel construction, arrangement and combination of parts herein shown and described and more particularly pointed out in the claims.

In the drawings, wherein like reference characters indicate like or corresponding parts, Figure 1 is a side elevation of the device in locked position;

Fig. 2 is a similar view in its unlocked position;

Fig. 3 is a sectional view taken substantially on line 3—3 of Fig. 4 through the automatic locking mechanism;

Fig. 4 is a section taken substantially on line 4—4 of Fig. 3;

Fig. 5 is a section taken substantially on line 5—5 of Fig. 3;

Fig. 6 is a section taken substantially on line 6—6 of Fig. 3; and

Fig. 7 is a view similar to a portion of Fig. 3 with the device substantially in the position shown in Fig. 2.

Referring to the drawings, 1 represents the animal's head, and 2 its mouth, it being understood that the operation of the device is the same whether used on a dog, as shown, or on other animals. I provide a band arranged to encircle the muzzle or snout of the animal and consisting of the parts 3 and 4, connected at one or both sides, as shown at each side by the parts 5 hereafter described in detail, the band being connected by straps 6 or the equivalents, with a collar or encircling band 7, ordinarily arranged at the neck of the animal. It should be understood that the parts 3, 4, 6 and 7 may be of suitable size and material, and that the same may be modified or such additional straps may be employed as found desirable or necessary.

The part 5, one of which is preferably arranged at each side, is substantially an expansible connecting member between the adjacent ends of the parts 3 and 4, which will be automatically locked against expansion when the animal's head is raised. The part 5 consists of an outer casing or shell 8 of suitable size and material open at one end, which is preferably provided with an extended part 9 at one side having an opening 10 therethrough, and with the part 11 at one end having an opening 12 therethrough. The straps or connecting members 3 and 6, or their equivalents, are secured to the extending parts 9 and 11, as shown, in any suitable manner. Arranged within the outer casing 8 is an inner casing 15, which substantially closely fits the same, and which may be provided with a flange or extending part 16 at the open end of the outer casing. Arranged within the outer casing is a member 17 which may be provided with a stop 18, the member 17 and casing 15 being secured in place by screws 19 and 20, or their equivalents. I have shown one screw 19 tubular, and arranged on the interior for threaded engagement with the screw 20.

Arranged within the casing and slidable therein is a U-shaped part consisting of the legs 22 and connecting part, the outer end 23 of which is provided with a slot or hole 24 through which the strap 4 may be passed and secured. It will be noted by referring to Figs. 3 and 5 that the parts are so designed that there is a space 25 formed between part 17 and one of the legs 22. A spring 26 is arranged in a portion of the space, one end being secured at 27 to a part of the casing, and the other end secured to a lug or projecting part 28 on the adjacent leg 22. I have also shown a compression spring 26′, which acts on the part 22, it being understood that either or both springs may be employed.

On the opposite side of part 17 I preferably provide a recess or notch 29 having an inclined face 30, the notch being of sufficient depth to receive a ball 31, or its equivalent for the purpose. The adjacent leg 22 is preferably provided with a series of notches 32 arranged substantially as shown, the depth of the same being preferably sufficient to receive and engage the ball when the same is in the position shown in Fig. 3 (dotted lines). It will be noted by referring to this figure that the center of the ball has passed beyond the meeting faces of the two parts 17 and 22, and that the part 22, by virtue of the depth of the recess 32, partially surrounds and firmly engages the ball. Any suitable locking means may be employed to prevent opening the muzzle at all times that may be desired. I have shown a locking member 35 (see Fig. 3) carried by screws 19—20, which may be turned into the recess 29, and maintain ball 31 in locking position at all times, so the animal's mouth is locked shut regardless of whether the head is elevated or lowered.

When the animal's head is substantially as shown in Fig. 2, part 5 will be substantially as shown in Fig. 7, in which case it will be noted that the ball is retained in recess 29. Part 22 is free to slide in the casing, being limited by the engagement of the extension 28 with the stop 18. The animal is therefore free to open and close its mouth, the spring 26 taking up the slack and drawing 22 into the casing each time the animal shuts its mouth. Should the animal raise its head, however, as indicated in Fig. 2, or elevates its muzzle or snout, ball 31 will take the position shown in the full lines in Fig. 3, and upon the animal attempting to open its mouth, the ball will take the position shown in the dotted lines, locking part 22 against sliding. It will be obvious that in this case the animal's mouth will be locked shut and can not be opened until the snout is dropped as shown in Fig. 2. In the case of a dog, the same may easily feed or drink water, or open his mouth when his head is down, or his muzzle or snout depressed or lowered. However, he can not open his mouth and bite or snap when the snout is elevated. In the case of horses or cattle equipped with a device of this kind, the same may easily eat grass but can not open the mouth and damage trees or bushes, consequently the horse might be pastured in an orchard without injury to the orchard. In the case of calves equipped with one of these devices, the same can not feed from the cow.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:—

1. In an animal securing device of the kind described and in combination, a band arranged to encircle the muzzle of the animal, said band including an expansible part, and means for automatically locking said part against expansion when the animal's head is in raised position.

2. In an animal muzzle, a pair of locking devices, comprising a pair of expansible members, means for yieldingly preventing the expansion of said members, and means for automatically locking said members against expansion when the members are tilted, a strap connecting said devices and of a length to extend over the animal's snout, and a second strap connecting said devices and of a length to extend under the animal's snout, a neck band, and means for connecting each of said devices with said neck band.

3. In an animal muzzle of the kind described and in combination, a band arranged to encircle the muzzle of the animal, a neck band, and connecting means between said bands, said first mentioned band including expansible parts at each side having means for automatically contracting the same, and means for automatically locking the parts against expansion upon movement of the parts in a predetermined manner.

4. A muzzle locking device consisting of two parts secured together and slidable relative to each other and arranged for attachment of coöperating muzzle straps thereto, means for limiting the sliding movement of said parts, means for yieldingly preventing the sliding of said parts, and automatically operable means for positively locking said parts against relative sliding movement when the muzzle of the animal is in raised position.

5. An animal muzzle locking device consisting of two parts slidably secured together, means for normally preventing the sliding of said parts, manually operable locking means for said parts, and gravity operable means for automatically positively locking said parts against relative movement when the animal's muzzle is elevated.

6. A muzzle locking device of the kind described comprising two telescopic parts, said parts arranged for attachment with muzzle straps, means for normally contracting and maintaining said parts in said contracted positions and yieldingly preventing the expansion thereof, and automatically operable means for positively locking said parts together and preventing expansion thereof upon movement of the parts in a predetermined manner.

7. A muzzle locking device of the kind described comprising two telescopic parts, each of said parts arranged for attachment with muzzle straps, means for normally contracting and maintaining said parts in contracted positions, normally inoperative manually operable locking means, and automatically operable means for positively preventing the expansion of said parts upon movement of the parts in a predetermined manner.

8. A device of the kind described comprising a casing provided with means for securing straps thereto, a member slidably arranged within said casing with one end projecting to the exterior thereof and formed for the attachment of a strap thereto, a spring arranged within the casing for yieldingly opposing the withdrawal of said slidable part and retrieving the same, means for limiting the movement of said slidable part, and means for locking said part against sliding movement including a ball arranged to engage said slidable part and prevent the withdrawal thereof when the device is held in a predetermined manner.

9. A locking device of the kind described consisting of a casing open at one end and provided with a strap engaging member at the other end, and with a strap engaging member at one side, an inner shell arranged within said casing and provided with a flange of a size to partially cover said open end of said casing, a U-shaped member having the legs thereof inserted in said casing with the opposite end at the exterior of the casing and provided with strap engaging means thereat, a part arranged within said casing between said legs, means for securing said part to said casing, a spring arranged within the casing and having one end anchored therein and the other end secured to one of said legs between the leg and said fixed part, the opposite leg at the edge adjacent said fixed part provided with a cam face and of a size to entirely receive the ball, a notch on said leg of a size to only partially receive said ball, whereby engagement of the ball with the notch on the leg and with said cam face will lock said U-shaped part against withdrawal.

In testimony whereof I have hereunto signed my name in the presence of two subscribing witnesses.

GEORGE W. SPAHR.

Witnesses:
 ROY W. HILL,
 CHARLES I. COBB.

Copies of this patent may be obtained for five cents each, by addressing the "Commissioner of Patents, Washington, D. C."